United States Patent
Nishii et al.

[11] Patent Number: 5,716,762
[45] Date of Patent: Feb. 10, 1998

[54] PRODUCTION METHOD OF DIFFRACTION GRATING

[75] Inventors: Junji Nishii; Hiroshi Yamanaka, both of Ikeda, Japan

[73] Assignee: Agency of Industrial Science & Technology, Tokyo, Japan

[21] Appl. No.: 744,325

[22] Filed: Nov. 7, 1996

[30] Foreign Application Priority Data

Nov. 17, 1995 [JP] Japan ................................. 7-323825

[51] Int. Cl.⁶ .......................... G02B 5/18; G02B 1/12
[52] U.S. Cl. .................................... 430/321; 430/945
[58] Field of Search ........................... 430/321, 945, 430/290, 322; 359/566

[56] References Cited

U.S. PATENT DOCUMENTS

| | | | |
|---|---|---|---|
| 4,877,717 | 10/1989 | Suzuki et al. | 430/321 |
| 5,028,105 | 7/1991 | Drexhage et al. | 385/33 |
| 5,287,427 | 2/1994 | Atkins et al. | 430/321 |

*Primary Examiner*—John A. McPherson
*Attorney, Agent, or Firm*—Nikaido Marmelstein Murray & Oram, LLP

[57] ABSTRACT

This invention provides a method of producing a diffraction grating of a spectroscope by applying light to a thin film of glass having characteristics such that a density change occurs with the change of a glass structure upon irradiation of light and volume expansion occurs irreversibly. The method comprises applying light to a diffraction grating formation of a surface of the thin film by applying light through a phase mask or applying interference light, and causing the light irradiation portion of glass to expand and to thereby form the diffraction grating. Light to be applied is generally laser beams of ultraviolet rays, such as an excimer laser, a Nd-YAG laser or UV higher harmonics of a dye laser. A laser beam of a visible light region can be used, too. Preferably, a silica single crystal plate is used for the substrate of the thin film, and sputter vacuum deposition is used for forming the thin film. The glass composition whose volume expands upon irradiation of light is $GeO_2$—$SiO_2$ type glass having a $GeO_2$ content of 20 to 95 mol %, but this composition is not particularly limitative, and any glass compositions can be used so long as they have a high volume expansion coefficient.

3 Claims, No Drawings

PRODUCTION METHOD OF DIFFRACTION GRATING

BACKGROUND OF THE INVENTION

This invention relates to a production method of a glassy diffraction grating by irradiation of light.

Conventional diffraction gratings using glass have been produced generally by machinework, but photolithography is known as one of optical production methods. However, this conventional optical means involves the problem that the production cost is extremely high. In this aspect, optical processing can be easily carried out if a resin is used for a substrate, but another problem develops in this case that heat resistance as well as mechanical strength are low.

It is known that depending on the kind of glass used, some exhibit a density change accompanied by the change of a glass structure (and hence, the change of a refractive index) when a laser beam is applied.

Silica glass which transmits ultraviolet rays and near infrared rays, for example, has been used in the past as a base material of an optical fiber for communication, and $GeO_2$ is generally doped into the core portion of the fiber. When an argon ion laser beam having a wavelength of 488 nm or an excimer laser beam having a wavelength of 248 nm is applied to this optical fiber, the refractive index of the core changes (refer to K. O. Hill et al., Appl. Phys. Lett. 32(1978) 647 or R. M. Atkins et al., Electron. Lett. 29(1993)385.) However, the change of the refractive index in this case involves shrinkage of the volume and moreover, the change quantity of the refractive index is about $1\times10^{-4}$. Therefore, its application to fields other than the optical fiber is difficult.

On the other hand, the change of the optical refractive index is observed in $GeO_2$—$SiO_2$ glass produced by a sol-gel method, too (K. D. Simons et al., Opt. Lett. 18(1993) 25.) In this case, too, the change quantity of the refractive index remains at the same level as that of the optical fiber described above.

The inventor of the present invention has paid a specific attention to the fact that the density change by the irradiation of light irreversibly occurs in some kinds of glass, and has conducted intensive studies on the assumption that a diffraction grating the lattice gap of which is approximate to the wavelength level of light might be acquired by optical means if glass having a large volume expansion is obtained, and has succeeded in accomplishing this object.

SUMMARY OF THE INVENTION

It is therefore a first object of the present invention to provide a production method of a diffraction grating of a spectroscope by using glass whose volume irreversibly expands upon the irradiation of light.

It is a second object of the present invention to provide glass having a composition which has a sufficient volume expansion coefficient to form a diffraction grating.

A production method of a diffraction grating according to the present invention for accomplishing the objects described above comprises the steps of forming a thin film made of glass which exhibits an irreversible volume expansion upon the irradiation of light on a substrate, applying light to a diffraction grating formation portion on the surface of the thin film, and forming ridges (lines having a convexed shape in the transverse section) by expanding glass at the light irradiation portion to thereby obtain a diffraction grating.

Light to be applied is generally a laser beam in the ultraviolet region, but a laser beam in the visible ray region can be used, as well. Though these laser beams are generally applied by a pulse wave, a continuous beam may be applied if a power density is high. Generally, sufficient volume expansion cannot be attained if the power density of the beam to be applied is below about 5 $mJ/cm^2$, and the power density exceeding about 100 $mJ/cm^2$ is not generally preferable.

According to the method of the present invention, a diffraction grating having high heat resistance and high mechanical strength can be obtained accurately and easily by applying the laser beam to the thin film of glass whose volume expands upon the irradiation of light, and forming ridges having a cycle equivalent to that of the wavelength of the beam.

Though the formation of the glass thin film described above is not particularly limited, sputter vacuum deposition can be preferably used.

The light source to be used for the present invention, which is readily available, includes the excimer laser, the Nd-YAG laser and the ultraviolet rays by a dye laser (which preferably contains higher harmonics to improve efficiency), but the present invention is not particularly limited thereto.

The method of selectively applying the beam to the grating formation portion is not particularly limited, and preferred is the method involving the steps of disposing a phase mask formed in such a manner that the grating formation portion opens, on the thin film, applying the beam through the phase mask or applying an interference beam matching the intended diffraction grating to the surface of the glass thin film, and forming fringe-like protuberances corresponding to the cycle of the interference beam on the surface of the glass thin film.

There is no particular limitation to the composition of the glass thin film, and any glass materials can be used so long as they has a large volume expansion coefficient. A particularly preferred example of the glass thin film composition is $GeO_2$—$SiO_2$ type glass having a $GeO_2$ content of 20 to 95 mol %.

DESCRIPTION OF THE PREFERRED EMBODIMENTS

The glass thin film used for forming the diffraction grating in the present invention is preferably formed on a substrate having a flat optical surface such as a single silicon crystal by radio frequency sputter vacuum deposition. This radio frequency sputter vacuum deposition method can be carried out in a customary manner, and its condition is not particularly limited. Generally, this method is practised in the atmosphere of argon or an argon-oxygen mixed gas (with the oxygen volume content of up to 50%). A glass thin film exhibiting the change of the refractive index can be obtained even when the oxygen volume content in the argon-oxygen mixed gas exceeds 50%, but this atmosphere is not practical because the glass thin film formation rate becomes extremely low.

A preferred thickness of the glass thin film is preferably and generally 0.1 to 10 μm (100 to 100,000 Å). To improve laser resistance, the resulting glass thin film is preferably heat-treated at about 300° to about 800° C. in a customary manner.

A particularly suitable glass material to be used is $GeO_2$—$SiO_2$ type glass having a $GeO_2$ content of 20 to 95 mol % and more preferably 25 to 55 mol %. The change of the refractive index of $GeO_2$—$SiO_2$ type glass having the composition described above is substantially about −0.5% and the volume expansion ratio is substantially about +5%.

When the GeO$_2$ content is too small in the GeO$_2$—SiO$_2$ type glass thin film, a large volume change cannot be observed even when light is applied, and concavo-convexities cannot be formed easily. When it is too great, on the other hand, glass is colored in yellow, or water-proofness of glass drops.

The following methods can be employed for forming the diffraction grating. (1) A phase mask is disposed in advance on the surface of the glass thin film, and light irradiation is effected through this phase mask so as to form periodical concavo-convexities. (2) Interference light of laser is applied to the surface of the glass thin film so as to form concavo-convexities corresponding to the cycle of the interference waves on the glass surface. Examples of the light source for forming these concavo-convexities are the excimer laser of ArF, KrF, etc, the Nd-YAG laser, the Ar ion laser or UV higher harmonics of the dye laser.

According to the present invention, the diffraction grating having high heat resistance and high mechanical strength can be easily obtained by applying light to the surface of the thin film formed by glass whose volume expands upon irradiation of light, by sputter vacuum deposition, for example to form concavo-convexities having a cycle equivalent to that of light wavelength.

Hereinafter, Examples of the present invention and Comparative Examples will be given in order to further clarify the characterizing features of the present invention.

EXAMPLE 1

A silicon single crystal substrate was disposed inside a chamber of a sputter vacuum deposition apparatus, and an atmospheric gas having a composition of 80% of an Ar gas and 20% of an O$_2$ gas was supplied into the chamber at a flow rate of 3 cc/min and at an internal pressure of the chamber of about 10$^{-2}$ Torrs so as to deposit a glass thin film of 25 mol % of GeO$_2$ and 75 mol % of SiO$_2$ on the substrate at a rate of about 8 nm/min for about 300 minutes. Whether or not the composition of the thin film was regulated to the intended composition was checked by an X-ray photoelectron spectroscope (XPS). When the X-ray diffraction of the thin film was measured, a sharp diffraction peak due to the crystal of GeO$_2$ or SiO$_2$ could not at all be observed.

The resulting glass thin film was heat-treated at 500° C. for 1 hour in vacuum, a phase mask made of silica glass and having grooves ditched within the range of 5×10 mm with 1 μm pitch was placed on the thin film. Next, 1,200 pulses of an ArF excimer laser pulses having a wavelength of 193 nm and a power density of 30 mJ/cm$^2$ were applied from immediately above the phase mask.

When the surface of the material so obtained was inspected by an electron microscope, concavo-convexities having a height of 0.2 μm were found formed on the surface.

When a He—Ne laser was applied to the concavo-convexity portion of the resulting material, it was confirmed that primary diffraction efficiency was about 7%.

EXAMPLE 2

A glass thin film was produced in the same way as in Example 1, and 1,000 shots of a Ne-YAG laser beam (wavelength: 266 nm) of 1 mJ/mm$^2$ was applied from both directions at an angle of normal of 45° by using a mirror. Concavo-convexities corresponding to the interference waves were formed on the glass surface, and diffraction of the Ne—He laser similar to the diffraction grating of Example 1 was confirmed.

EXAMPLES 3 to 6

Thin films were produced by using glass having the compositions shown in Table 1 in the same way as in Example 1, and each thin film was heat-treated at 500° C. for one hour in vacuum. Then, 1,200 pulses of an ArF excimeter laser pulses were applied through the same phase mask as that of Example 1. As a result, it was confirmed by the inspection through an electron microscope that concavo-convexities having the gaps tabulated in Table 1 were formed.

TABLE 1

| Example | glass composition (mol %) | atmospheric gas (vol %) | film thickness(Å) | write laser |
|---|---|---|---|---|
| 1 | 25GeO$_2$—75SiO$_2$ | 20%O$_2$–80%Ar | 24000 | ArF excimer |
| 2 | 25GeO$_2$—75SiO$_2$ | 20%O$_2$–80% Ar | 24000 | YAG 4th higher harmonics |
| 3 | 40GeO$_2$—60SiO$_2$ | 100%Ar | 30000 | ArF excimer |
| 4 | 55GeO$_2$—45SiO$_2$ | 20%O$_2$–80% Ar | 34000 | ArF excimer |
| 5 | 70GeO$_2$—30SiO$_2$ | 20%O$_2$–80% Ar | 30000 | ArF excimer |
| 6 | 28GeO$_2$–72SiO$_2$ | 100%Ar | 30000 | ArF excimer |

Incidentally, Table 1 illustrates the results of Examples 1 and 2, too.

Comparative Example 1

A glass thin film having the composition of 10 mol % of GeO$_2$ and 90 mol % of SiO$_2$ was deposited at a rate of about 8 nm/min for about 300 minutes on the silicon single crystal substrate in an atmospheric gas having the composition of 80% of Ar and 20% of O$_2$ at a flow rate of 3 cc/min and an internal pressure of the chamber of about 10$^{-2}$ Torr. The change quantity of the refractive index was about +1×10$^{-4}$ and its volume change ratio was 0.001%.

The production of the diffraction grating was attempted by using the resulting thin film in the same way as in Example 1, but concavo-convexities were not formed on the surface according to the inspection through an electron microscope.

Comparative Example 2

GeO$_2$ glass was allowed to deposit on a silicon substrate under the same condition as in Comparative Example 1 and was left standing for one week in air. Then, white turbidity was observed on the glass surface. When glass of each of Examples 1 to 6 was subjected to the same test, white turbidity was not at all observed.

What is claimed is:

1. A method of producing a diffraction grating, comprising the steps of:

forming on a substrate a thin film of a glass which can be subjected to a light irradiation to irreversibly undergo a volume expansion, and applying an interference light to a portion of a surface of said thin film to form a diffraction grating, thereby causing the glass in said portion to expand and form ridges, wherein an interference light is applied to said surface of said thin film to form ridges in a striped pattern corresponding to the cycle of said interference light.

2. A method of producing a diffraction grating, comprising the steps of:

forming on a substrate a thin film of a glass which can be subjected to a light irradiation to irreversibly undergo a volume expansion, and applying light to a portion of a surface of said thin film to form a diffraction grating and thereby causing the glass in the irradiated portion to expand and form ridges, wherein said thin film of glass is formed by a sputter vacuum deposition method.

3. A method of producing a diffraction grating, comprising the steps of:

forming on a substrate a thin film of a glass which can be subjected to a light irradiation to irreversibly undergo a volume expansion, and applying light to a portion of a surface of said thin film to form a diffraction grating and thereby causing the glass in the irradiated portion to expand and form ridges, wherein said thin film of glass has a composition of a $GeO_2$—$SiO_2$ glass having a $GeO_2$ content of 20 to 95 mol %.

* * * * *